Figure 1:
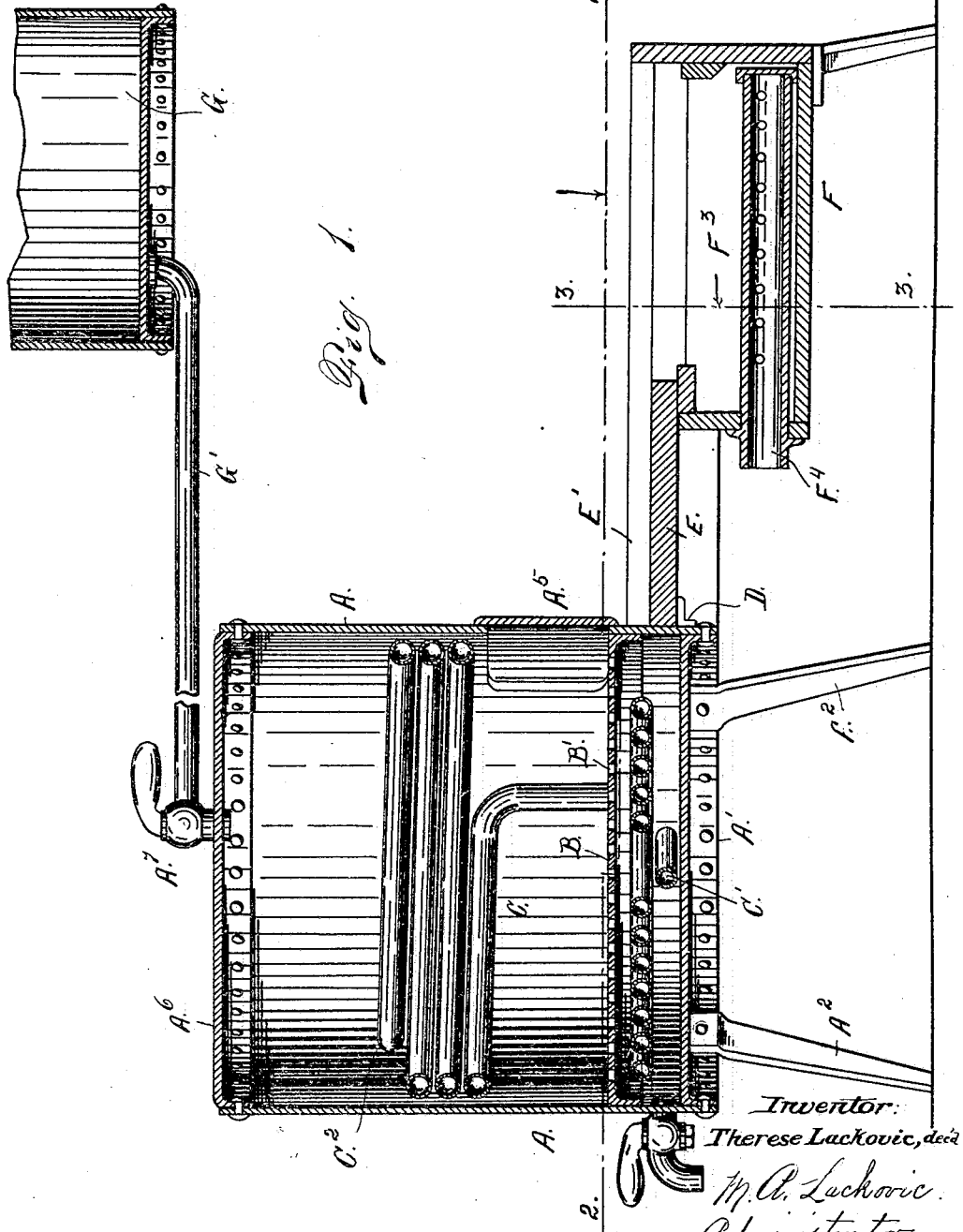

No. 766,269. PATENTED AUG. 2, 1904.
T. LACKOVIC, DEC'D.
M. A. LACKOVIC, ADMINISTRATOR.
APPARATUS FOR DESICCATING POTATOES.
APPLICATION FILED APR. 11, 1904.
NO MODEL. 2 SHEETS—SHEET 1.

Witnesses
Otto E. Hoddick
Dena Nelson

Inventor:
Therese Lackovic, dec'd
M. A. Lackovic
Administrator.
By
Attorney

No. 766,269. PATENTED AUG. 2, 1904.
T. LACKOVIC, DEC'D.
M. A. LACKOVIC, ADMINISTRATOR.
APPARATUS FOR DESICCATING POTATOES.
APPLICATION FILED APR. 11, 1904.
NO MODEL. 2 SHEETS—SHEET 2.

Inventor:
Therese Lackovic, dec'd.
M. A. Lackovic.
Administrator.

No. 766,269. Patented August 2, 1904.

UNITED STATES PATENT OFFICE.

MICHAEL AUGUST LACKOVIC, OF DENVER, COLORADO, ADMINISTRATOR OF THERESE LACKOVIC, DECEASED.

APPARATUS FOR DESICCATING POTATOES.

SPECIFICATION forming part of Letters Patent No. 766,269, dated August 2, 1904.

Application filed April 11, 1904. Serial No. 202,712. (No model.)

*To all whom it may concern:*

Be it known that I, MICHAEL AUGUST LACKOVIC, a citizen of the United States of America, residing in the city and county of Denver and State of Colorado, am the administrator of the estate of THERESE LACKOVIC, deceased, late a citizen of the United States, and who was the inventor of certain new and useful Improvements in Apparatus for Desiccating Potatoes; and I do hereby declare the following to be a full, clear, and exact description of the said invention, such as will enable others skilled in the art to which it appertains to make and use the same, reference being had to the accompanying drawings, and to the letters of reference marked thereon, which form a part of this specification.

This invention relates to an apparatus for desiccating potatoes whereby the latter may be kept for an unlimited time in any climate, while retaining their nourishing and sweet-tasting qualities.

The objects of the invention are, first, to preserve potatoes by desiccation without the use of chemicals or other foreign substances in such a manner that they not only will retain their nourishing and aromatic qualities for any length of time and in any climate, but that at any time after soaking them in water for a certain period they may be utilized in any of the various ways now in use in preparing the raw potatoes for the table, such as boiling, frying, mashing, &c.; second, to produce as an article of food desiccated potatoes having all the qualities of the raw roots, but which may be kept in any climate for an indefinite time and so reduced in weight that travelers when going on long voyages into remote and uncivilized countries may carry large quantities without having to burden themselves with unwieldly and heavy articles of transportation. These objects are obtained by desiccating the potatoes in the following manner: The potatoes after having been cleaned, pared, and relieved of so-called "eyes" and other spots are cut into pieces of any shape or size and are placed in a vessel or tank which previously has been partly filled with hot water. When all the potatoes have been immersed in the tank, the vessel is closed and the hot water contained therein subjected to heat from any suitable source until its temperature has reached the boiling-point. The water is now allowed to boil for three consecutive minutes, after which the heat is removed, the boiling water rapidly drained from the tank, and cold water thrown over the potatoes until they are thoroughly cooled off. The boiling period may be varied to four minutes in case the potatoes are of an unusually hard quality, but should never exceed that length of time, as careful experimenting has proven that should the potatoes be allowed to remain in the boiling water for more than three or four minutes the starch and sugar contained in the potatoes will be brought to a state which destroys the qualities it is my object to retain. It is therefore essential that the boiling water should be drained very rapidly from the vessel the moment the allotted time has elapsed, and the cold water should be let into the vessel simultaneously, so as to prevent further boiling. For practically the same reason it has been found impracticable to place the potatoes in the water unpared, as the time required for scalding them destroys their strength and sweetness. It will be observed that the main object of this first part of said process is to scald, not to boil, the potatoes for the purpose of destroying the poison contained in the potatoes when in a raw state and which prevents preservation for any length of time. When the potatoes are thoroughly cooled off, they are taken out of the tank and subjected to a temperature of from 80° to 90° Fahrenheit by placing them, not too thickly, on open or perforated tables or any other device which will allow the heat to completely surround the pieces of potato, and thus dry them evenly and quickly.

Experience has taught that the best results are obtained by having the source of heat underneath the table on which the potatoes rest, thus allowing the heat to pass upward through the apertures in the tables.

It is essential that during the drying process the temperature should not vary much from 80° to 90° Fahrenheit, for if the potatoes were placed in a lower temperature the process of drying would naturally be slow in proportion, with the result that while the outside of the potatoes was drying the inmost particles would remain in a moist condition, and consequently decay. On the other hand, if the temperature is too high the moisture contained in the potatoes will be allowed to boil, which, as heretofore explained, will destroy the qualities of the product desired to be obtained.

The potatoes when coming from the drying-tables are ready for market. When broken, they present a glass-like crystallized appearance, a state in which they will remain for an indefinite time.

When it is desired to use the desiccated potatoes, they may be placed in hot hater and soaked for about a half-hour. Gradually they will assume the appearance of the raw product before it was scalded and dried, and when taken from the water they may be mashed, sliced, or left whole, and prepared in any known manner, such as boiling, frying, &c.

When eaten, it will be found that the potatoes are as nourishing and sweet-tasting as the fresh product and they have lost none of the qualities which have given the fresh roots the important place among the articles of food now in use.

Having explained the objects to be attained by the operation of this improved apparatus, the same will be described in detail, reference being made to the accompanying drawings, in which is illustrated an embodiment thereof.

Figure 2:
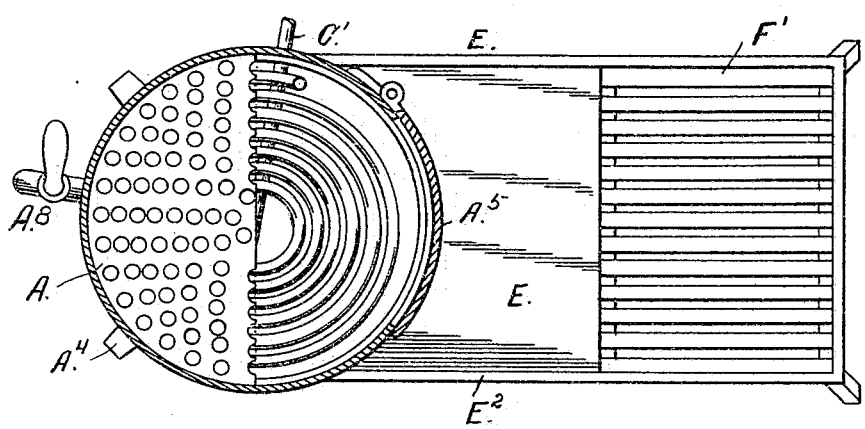
Figure 3:
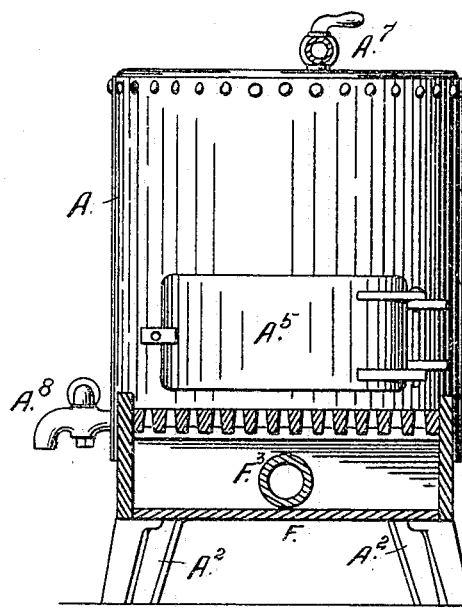

In the drawings, Figure 1 is a vertical section of the device. Fig. 2 is a horizontal section taken along the line 2 2, Fig. 1, viewed in the direction of the arrow, the parts being shown on a smaller scale. Fig. 3 is a cross-section along the line 3 3, Fig. 1, also shown on a smaller scale.

Similar reference characters refer to similar parts throughout the various views.

A represents the vessel or tank in which the potatoes are scalded. It consists of a hollow cylinder having a top $A^6$ and a bottom $A'$. A perforated partition B is secured on the inside of the cylinder parallel to the bottom and in close proximity thereto and acts as a support for the potatoes. The tank is supported by three or more legs $A^2$, and the heat is supplied by means of a steam-pipe C, which, in the shape of a series of coils, lies underneath the partition B, through which it passes upward and after being coiled a number of times along the inside periphery of the tank A leaves same at $C^2$. The inlet of the steam is at $C'$.

One or more faucets at the bottom of the tank are used for draining the hot water, while the cold water may be made to flow on the scalded potatoes from any suitable source through a faucet $A^7$ in the top of the tank, which faucet controls the flow of water through a conduit $G'$, leading from a water-supply tank G, elevated to cause the water to flow from one tank to the other by gravity.

The potatoes are taken from the tank through a door $A^5$ and placed on a table E, having flanges $E'$ and supported by a bracket D. They are dried on the box-shaped table F, the top of which is composed of a number of slats $F'$, on which the scalded potatoes are placed.

$F^4$ is a perforated pipe located below the slats $F'$ in the lower portion $F^3$ of the table for conducting the hot air necessary for drying the potatoes.

Having thus described the invention, what is claimed is—

1. The combination of a tank adapted to contain water and provided with an inlet and an outlet, the one being located at the top and the other connected with the lower part of the tank, a plate located in the tank and having openings to permit the circulation of water above and below the same, a heating-pipe located within the tank and provided with an inlet and an outlet for the circulation of heating fluid therethrough, the tank being provided with a door adapted to close an opening on a level with the said plate.

2. The combination of a tank, provided with an inlet and an outlet, the latter being located at the bottom of the tank, a perforated plate located in the tank, a door closing an opening whose lower part is on a level with the perforated plate, and a heating-pipe provided with coils located both above and below the perforated plate, the said pipe having an inlet and an outlet to permit the circulation of the heating fluid.

3. The combination of a main tank adapted to contain water, a supply-tank whose bottom is connected with the top of the main tank, a perforated plate located in the main tank, heating-coils located both above and below the plate, and a door closing an opening above the plate, the main tank being also provided with a valve-controlled outlet located below the perforated plate.

4. The combination of a tank provided with a plate located near its bottom and provided with openings to permit the circulation of water above and below the plate, coils located within the tank for heating the same, said tank being provided with an inlet at the top of the tank and an outlet at the bottom thereof, and a table located in front of a door with which the tank is provided, the said door closing an opening therein.

5. In an apparatus for desiccating potatoes, the combination of a tank provided with a perforated plate near its bottom for the support of the potatoes to be treated, means for introducing a suitable quantity of water to the tank, the tank being provided with a valve-controlled outlet located below the perforated plate, the tank being provided with an opening and a door for closing the same, and a table located in front of the tank and whose top is open for the passage of heat to dry the potatoes after removing them from the tank, and means located below the table-top for subjecting the potatoes to the action of heat, substantially as described.

In testimony whereof I affix my signature in presence of two witnesses.

MICHAEL AUGUST LACKOVIC,
*Administrator of the estate of Therese Lackovic, deceased.*

Witnesses:
A. J. O'BRIEN,
DENA NELSON.